United States Patent [19]

Hammes

[11] Patent Number: 4,486,890

[45] Date of Patent: Dec. 4, 1984

[54] CONTROL ARRANGEMENT FOR AN ACREAGE COUNTER

[76] Inventor: Leo R. Hammes, R.R. 3, Box 151, Seneca, Kans. 66538

[21] Appl. No.: 285,389

[22] Filed: Jul. 20, 1981

[51] Int. Cl.³ .............................................. G01B 5/26
[52] U.S. Cl. ..................... 377/24; 364/564; 33/123; 377/16; 377/44; 377/53
[58] Field of Search ............. 364/564; 33/123; 377/2, 377/44, 19, 24, 53, 16

[56] References Cited
U.S. PATENT DOCUMENTS 2,469,655  5/1949  Leathers ..................... 235/144 M
4,199,719  4/1980  Grob .................................. 324/166

Primary Examiner—Joseph A. Orsino, Jr.
Assistant Examiner—Timothy K. Greer
Attorney, Agent, or Firm—Litman, Day & McMahon

[57] ABSTRACT

A control system for an acreage counter, controllable by an electrical logic condition, includes: a flip-flop having enable logic condition output upon being set, and an inhibit logic output upon being reset; an enable counter and an inhibit counter connected respectively to the set and reset inputs of the flip-flop; an enable clock and an inhibit clock connected respectively to the enable and inhibit counters; and sensors or switches connected to the respective counters and cooperating respectively with an operating lever or operating switches of an agricultural implement to actuate the associated counters upon change in the status of the operating controls. The clocks and counters function to delay setting or resetting of the flip-flop for a selected time so that minor adjustments may be made to the working position of the implement without falsely initiating or interrupting the acreage counter.

14 Claims, 7 Drawing Figures

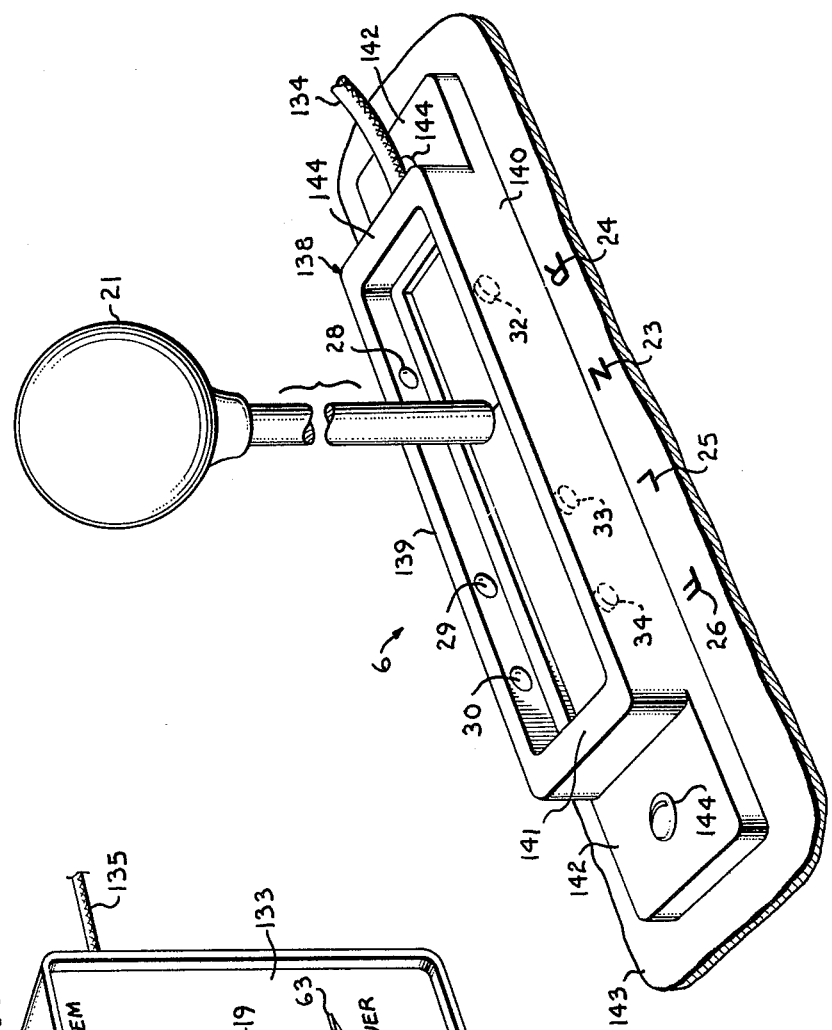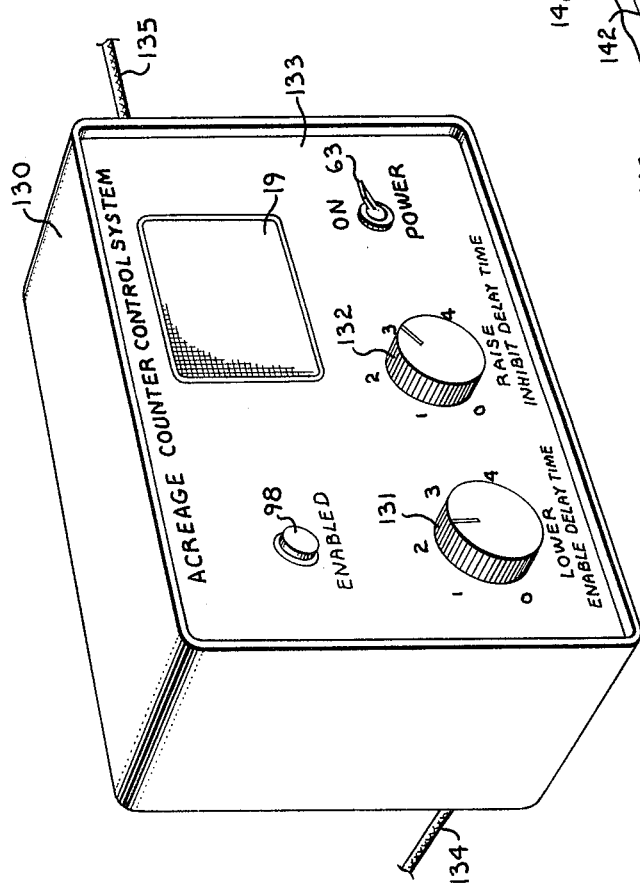

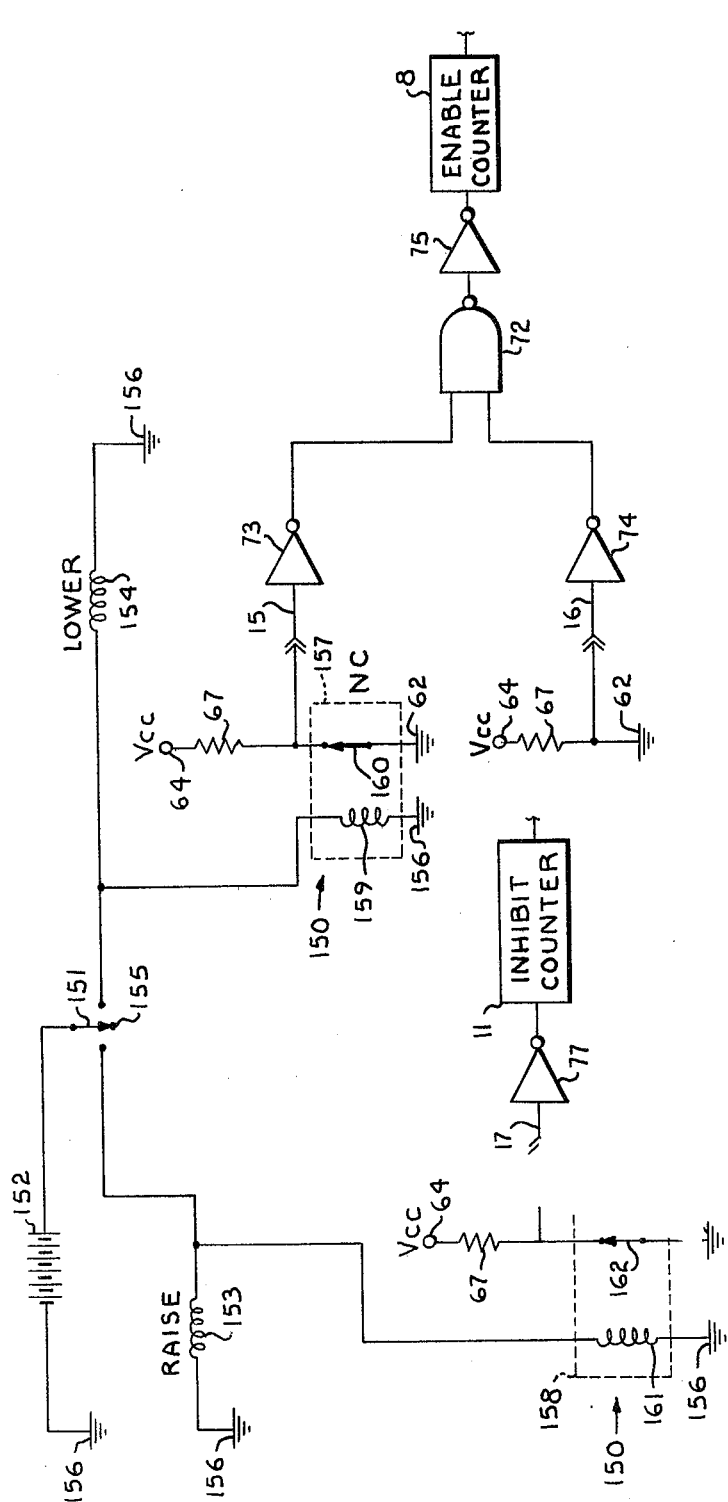
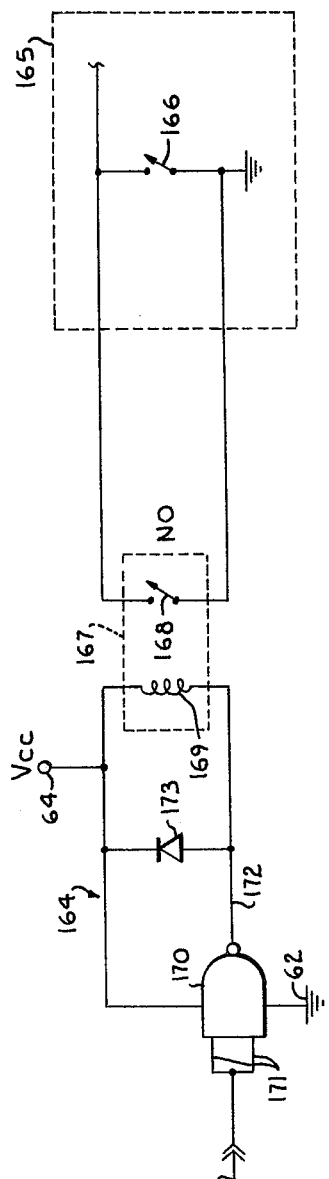
Fig. 6.
Fig. 7.

4,486,890

CONTROL ARRANGEMENT FOR AN ACREAGE COUNTER

FIELD OF THE INVENTION

The present invention relates to electronic acreage counters and, more particularly, to a control system which initiates or interrupts the acreage counting according to the status of operating controls of an agricultural implement with which the counter is used and which includes a delay function such that the working position of the implement may be adjusted without affecting the counting of acreage.

BACKGROUND OF THE INVENTION

Electronic acreage counters have been employed in conjunction with agricultural implements such that a farmer can more accurately monitor the acreage worked to thereby better plan procurement of seeds, fertilizers, and the like and to better estimate projected yield. Heretofore, acreage was estimated by reference to the width of the implement and to an odometer on the tractor to which the implement was hitched. However, the odometer records not only the distance traveled during actual soil working, but also the distance traveled in turning around at the ends of rows. On very large farms, where the distance traveled between turn arounds is relatively great, the percentage of error would be small and relatively insignificant. However, on smaller farms where cultivated rows are relatively short, the percentage of error would be relatively greater. Further, it would be time consuming and, therefore, inconvenient for the farmer to record the turn-around distance for later subtraction from the total distance traveled to arrive at distance cultivated. For these reasons, acreage counters separate from the odometers were developed.

In the known electronic acreage counters, control thereof is by manual switches and by position sensing switches on the implement. Manual switches require extra steps of the implement operator to make sure that the acreage counter begins counting as soil working begins and to cease counting at the end of a row. Should the operator forget to place the switch in the proper position, an inaccurate acreage would be determined. Position sensing switches, such as mercury switches, which sense the tilt of some portion of the implement are an improvement since the acreage counter may be switched on or off automatically at the end of a cultivated row, since the implement is usually raised during turn around and lowered as soon as cultivation resumes. However, the position sensing switch requires that a cable be run from the implement to the acreage counter in the cab of the tractor; and it would be necessary to mount a mercury switch on each implement used and to connect the switch to the counter each time the implement is hitched to the tractor. Further, the position and attitude of the switch would be somewhat critical to assure that the full working height range of the implement could be used without sending a false signal to the counter. Also, the switch might be sensitive to unevenness of ground such that false signals would be sent to the counter if bumps were encountered.

SUMMARY OF THE INVENTION

The present invention overcomes the difficulties of the control of prior acreage counters by providing a control system which senses the position or status of the operating controls which raise and lower the implement and which provides a control signal to start or stop the acreage counter in cooperation with the position or status of the operating control.

OBJECTS OF THE INVENTION

The principle objects of the present invention are: to provide a control system for an acreage counter to cause same to measure acreage only during soil working; to provide such a system in which the acreage counting is coordinated with the position or state of the operating controls which raise and lower a soil working implement with which the counter is used; to provide such a system in which small adjustments to the position of the implement during soil working do not falsely initiate or interrupt the acreage counting; to provide such a system which is adaptable to implements having either lever or switch operating controls; to provide such a system which does not require the placement of an attitude sensor on the implement to monitor the position of same; to provide such a system which sounds an alarm whenever a change in the acreage counting status is made; to provide such a system which is adaptable to either acreage counters which require a digital logic condition or counters which require the closing of switch contacts for control thereof; to provide such a control system which can provide either positive or negative polarity logic signals to control the acreage counter; to provide such a control system which may be used with acreage counters having logic voltage levels different from that of the control system; and to provide such a control system for an acreage counter which is economical to manufacture, positive in operation, durable in use, and which is particularly well adapted for its intended purpose.

Other objects and advantages of the present invention will become apparent from the following description taken in connection with accompanying drawings wherein are set forth, by way of illustration and example, certain embodiments of this invention.

The drawings constitute a part of the specification, include an exemplary embodiment of the present invention, and illustrate various objects and features thereof.

BRIEF DESCRIPTION OF THE DRAWINGS

FIG. 4 is a perspective view of a housing having the control circuit according to the present invention enclosed therein.

FIG. 5 is perspective view of a lever sensing bracket according to the present invention positioned in relationship to an operating lever of an agricultural implement with which the acreage counter controlled by the circuit of the present invention is employed.

FIG. 6 is a circuit diagram of a modified portion of the control circuit of the present invention for use in conjunction with an agricultural implement, the position of which is controlled by a switch.

FIG. 7 is a circuit diagram of a second modified portion of the control circuit of the present invention for use with an acreage counter which is enabled and inhibited by nonelectronic switch functions.

DETAILED DESCRIPTION OF THE PREFERRED EMBODIMENTS

Figure 2:
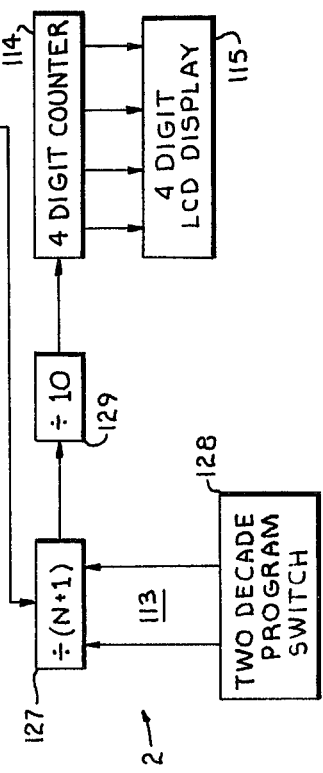
FIG. 2 is a block diagram of an acreage counter circuit with which the a control circuit of the present invention may be employed.

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
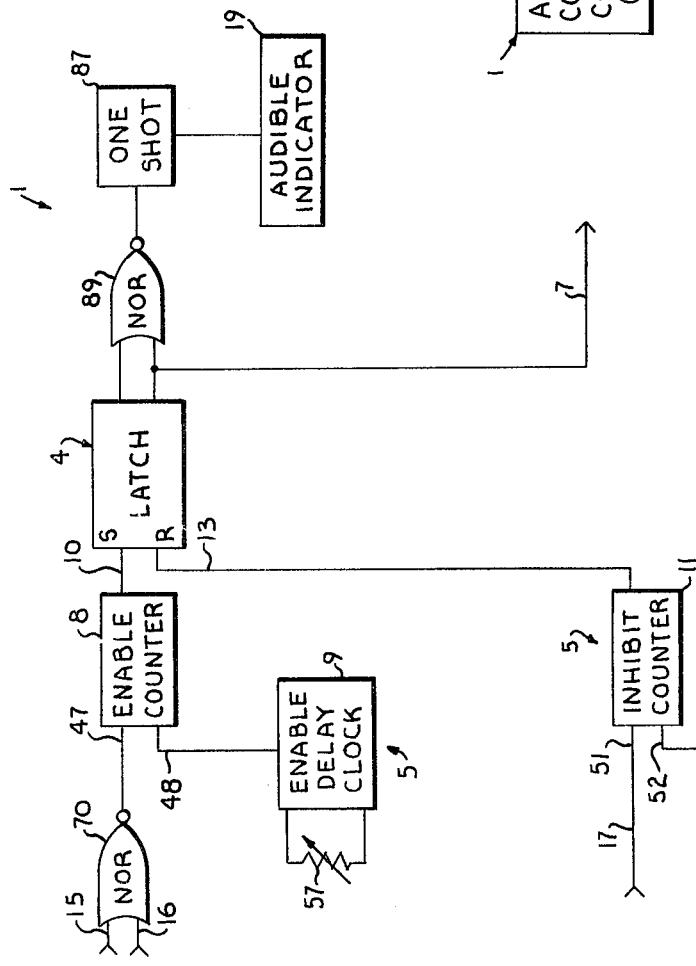
FIG. 1 is a block diagram illustrating the acreage counter control circuit of the present invention.

Referring to the drawings in more detail:

The reference numeral 1 generally designates a control circuit for supplying signals to activate or deactivate an acreage counter 2. Referring to FIG. 1, the control circuit 1 generally includes bistable switch means 4 for supplying the signals to the acreage counter 2, delay means 5 for selectively changing the state of the switch means 4, and actuating means 6 (see FIGS. 3 and 5) operable to actuate the delay means 5. The bistable switch means 4 is capable of two stable states. In a first of the states an enable logic condition is provided on an output 7 of the switch means 4 to the acreage counter 2 to cause same to begin counting acreage; and in a second state of the switch means 4, an inhibit logic condition is provided to the acreage counter 2 to cause same to cease counting acreage. Preferably, the delay means 5 includes an enable counter 8 having an enable delay clock 9 connected thereto and being connected to a set input 10 of the switch means 4 and an inhibit counter 11 having an inhibit delay clock 12 connected thereto and being connected to a reset input 13 of the switch means 4. The actuation means 6 are connected to enable inputs 15 and 16 and an inhibit input 17 of the control circuit 1. Preferably, indicator means such as an audible indicator 19 is included in the control circuit 1 and is responsive to a change in the state of the switch means 4 to give an audible indication thereof.

FIG. 5 illustrates one embodiment of the actuation means 6 positioned in association with an operating means or operating lever 21 which is selectively manipulated to control the working height of an agricultural implement (not shown) with which the acreage counter 2 is employed to record the acreage worked by the implement. The operating lever 21 would normally be connected to valves, or solenoids controlling same, of a hydraulic system including cylinders to raise and lower the implement. On some implements, the working portions thereof are raised by single acting hydraulic cylinders and lowered or (floated) under the influence of gravity. The lever 21 is normally in a neutral position, indicated by the "N" 23 in FIG. 5. In order to raise the implement, the lever 21 is placed in the raise position, indicated by the "R" 24, until the implement is raised to the desired height, after which the lever 21 is released to seek the neutral position 23. In a similar manner, to lower the implement, the lever 21 is held in the lower position, indicated by the "L" 25, until the implement has lowered to the desired working position, and then released. The operating lever 21 is normally located within the cab of a tractor employed to draw the implement. In order to provide for implements employing single acting cylinders, a float position, indicated by the "F" 26 is provided. Any convenient means for electrically sensing the position of the lever 21 may be employed in the control circuit 1. In the preferred actuating means 6, the position of the operating lever 21 is sensed by raise, lower, and float infrared light emitting diodes (LED's) respectively 28, 29, and 30 in cooperation with raise, lower, and float infrared phototransistors respectively 32, 33, and 34.

Figure 3:
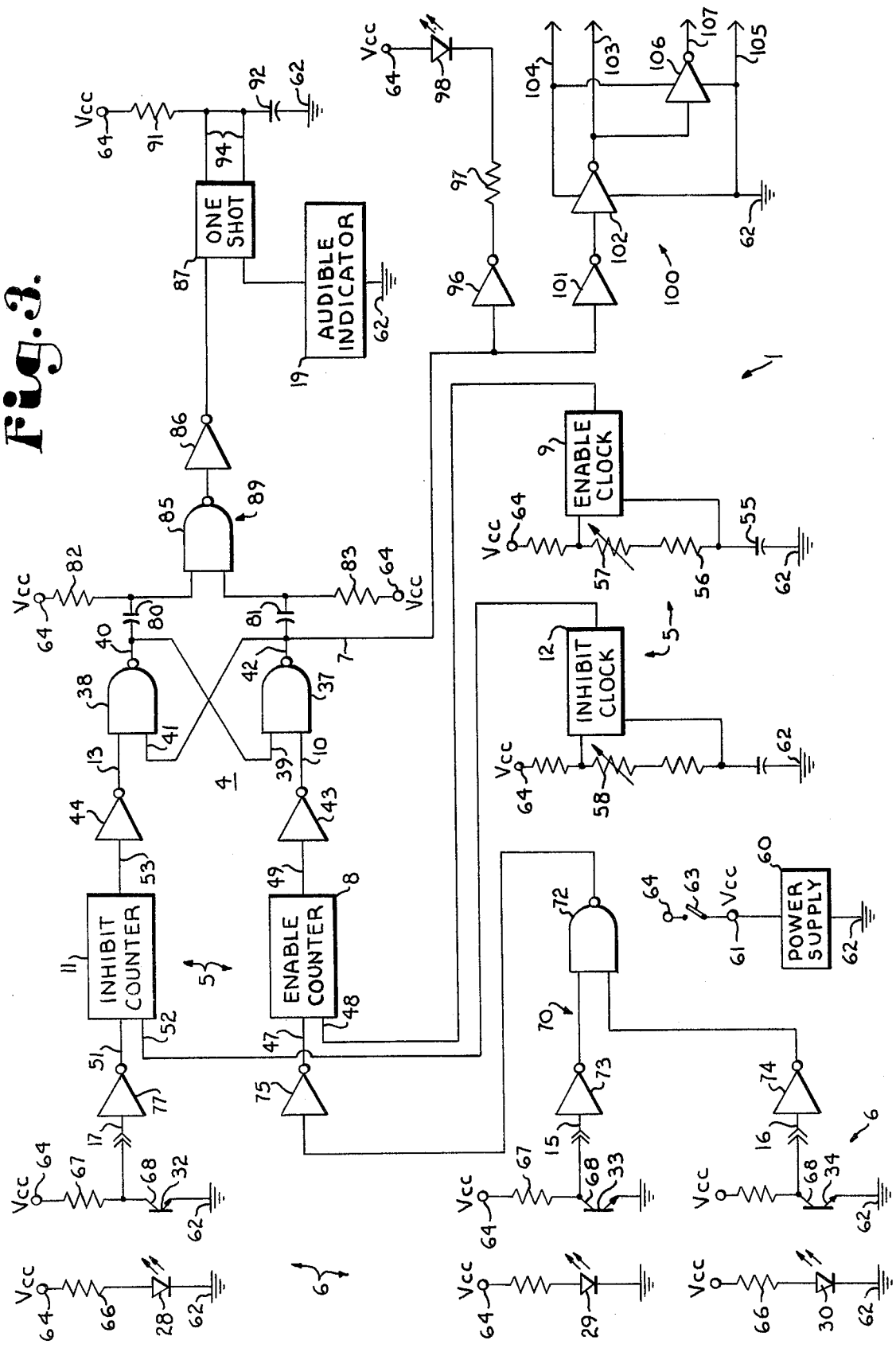
FIG. 3 is a circuit diagram illustrating the principal components of the control circuit according to the present invention.

Referring to FIG. 3, the bistable switching means 4 may be any type of switching configuration which is compatible with the counters 8 and 11 and with the acreage counter, such as switching transistors, flip-flops, or the like. In the illustrated embodiment, the switching means 4 is a latch circuit implemented by a pair of NAND gates 37 and 38 having cross coupled inputs and outputs. The NAND gate 37 includes the set input 10 of the latch 4 and a second input 39 connected to an output 40 of the NAND gate 38. The NAND gate 38 includes the reset input 13 of the latch 4 and a second input 41 connected to the output 42 of the gate 37. The output gate 42 of the 37 is synonymous with the output 7 of the latch 4. The set input 10 and reset input 13 are normally held at logic ones under the influence of the counters 8 and 11 as inverted by the respective inverters 43 and 44. Upon the application of a logic zero to the set input 10, a logic one is provided on the output 7 of the latch 4. The logic zero applied to the set input 10 may be a negative pulse of sufficient duration, and the latch 4 will lock into a first or set state with the logic one provided on the output 7 until the state of the latch is changed. Upon a logic zero being applied to the reset input 13, the latch 4 will change state and lock into a reset state thereby providing a logic zero on the output 7. The logic zero or logic one provided on the output 7 are thus employed as logic signals to control the operation of the acreage counter 2.

It takes a certain amount of time between movement of the lever 21 to raise or lower the implement and the moment at which the implement reaches the nonworking or working positions thereof. Further, it is sometimes necessary to make adjustments to the working height of the implement during soil working. The control circuit 1, therefore, includes the delay means 5 in order to reduce errors in acreage count and to prevent undesired initiation or cessation of acreage count during adjustment of the height of the implement. The delay means 5 is configured such that the operating lever 21 must be held in one of the raise 24, lower 25, or float 26 positions for a selected length of time before the state of the latch 4 is changed. The delay means 5 may be any type of circuit which is capable of providing the required delay. In the illustrated control circuit 1, the delay means 5 includes the enable counter 8 in combination with the enable clock 9 and the inhibit counter 11 in combination with the inhibit clock 12. Each of the counters 8 and 11 is a digital counter which provides an output pulse upon counting a selected number of pulses at an input thereof. The clocks 9 and 12 are low frequency oscillators whose frequencies are adjustable in order to provide an adjustable delay. The enable counter 8 has a reset input 47, a clock input 48, and an output 49. The enable clock 9 is connected to the clock input 48, while the reset input 47 has associated portions of the actuating means 6 operatively connected thereto. The output 49 is connected to the input of the inverter 43 and therethrough to the set input 10 of the latch 4. In a similar manner, the inhibit counter 11 has a reset input 51 having the associated portions of the actuating means operatively connected thereto; a clock input 52 having the inhibit clock 12 connected thereto; and an output 53 connected through the inverter 44 to the reset input 13 of the latch 4. The enable clock 9 includes a capacitor 55, a fixed resistor 56, and an adjustable resistor 57 in the frequency determining circuit thereof. In a similar manner, the inhibit clock 12 includes a capacitor and resistors, including an adjustable resistor 58, connected in the frequency determining circuit thereof. By varying the frequency of the clocks 9 and 12, the periods of the pulses therefrom are varied inversely. For example, decreasing the frequency of the enable clock 9 increases the duration of the pulses therefrom whereby the delay provided in combination with the enable counter 8 is increased. The inhibit clock 12 and inhibit counter 11 cooperate to perform in the same manner as do the enable clock 9 and enable counter 8.

A device which provides a suitable type of counter for the enable counter 8 and inhibit counter 11 is a CD 4518 B which is dual binary coded decimal up-counter which is manufactured in several types of integrated circuit packages by RCA. These counters provide positive output pulses on the respective outputs 49 and 53 for every ten clock pulses on the clock inputs 48 and 52 provided that the reset inputs 47 and 51 are held at logic zero during the counts. Once the latch 4 has changed states, for example, to the set state by means of the pulse from the enable counter 8, further pulses from the counter 8 do not change the state of latch 4. However, a pulse of the proper polarity from the inhibit counter 11 would be operative to change the state of the latch 4. While the latch 4 and delay means 5 as described above are preferred, it would be possible to provide the desired logic conditions at the output 7 by means of a single delay means and a type of flip-flop having a single input which would provide alternate logic zeros and ones each time the input is pulsed.

The control circuit 1 includes a power supply 60 having a 12 volt positive terminal 61, labeled $V_{cc}$, and a ground 62. The power supply 60 would normally be connected to the battery (not shown) of the tractor employed to draw the implement used with the acreage counter 2 and would include a voltage regulator and filters to eliminate electrical transients within the electrical system of the tractor. A power switch 63 is provided between the power supply terminal 61 and the remaining circuit terminals 64 in FIG. 3 which are labeled $V_{cc}$. It is to be understood that the majority of the circuit blocks, such as the counters 8 and 11 and clocks 9 and 12 and the like, require connections to the power supply 60. Such connections have been eliminated from FIG. 3 for clarity.

The actuating means light emitting diodes 28, 29, and 30 are connected with series resistors 66 across the power supply 60. Similarly, the phototransistors 32, 33, and 34 are connected with series resistors 67 across the power supply 60. The collectors 68 of the phototransistors are connected respectively to the enable inputs 15 and 16 and the inhibit input 17. When the power switch 63 is turned on, current flows through the LED's 28, 29 and 30, causing same to emit infrared light which is operative to bias the respective phototransistors into saturation thereby effectively grounding the inputs 15, 16, and 17 and thus establishing said inputs at a logic zero voltage level. Whenever the light from one of the LED's is blocked from the phototransistor associated therewith, such as by placement of the operating lever 21 in one of the raise, lower, or float positions, said phototransistor is biased into cut-off and a logic one, substantially the supply voltage, is provided on the associated input 15, 16, or 17. The enable inputs 15 and 16 are connected by means of a NOR gate 70 (FIG. 1) to the reset input 47 of the enable counter 8. In the preferred embodiment illustrated in FIG. 3, the NOR gate 70 is implemented as a NAND gate 72 with the inputs thereof complemented by respective inverters 73 and 74 and with the output thereof complemented by an inverter 75. The inhibit input 17 is connected to the reset input 51 of the inhibit counter 11 by means of an inverter 77.

The audible indicator 19 is provided to alert the operator of the agricultural implement that the change of state has taken place with regard to the acreage counter 2, that is, the acreage counter 2 has either begun or resumed counting or has ceased counting acreage. The audible indicator 19 may be any type of sounding device which is compatible with the logic and circuitry of the control circuit 1. In the control circuit 1, the outputs 40 and 42 are connected to a respective integrating network including respective capacitors 80 and 81 and resistors 82 and 83. The connection point between the capacitor 80 and resistor 82 is connected to one input of a dual input NAND gate 85, and the connection point between the capacitor 81 and resistor 83 is connected to the other input thereof. The output of the gate 85 is connected through an inverter 86 to the input of a one-shot or monostable multivibrator 87. The output of the one-shot 87 is connected to the audible indicator 19. The audible indicator 19 is preferably a device such as an SC 628 "Sonalert" manufactured by P. R. Mallory and Company, Inc. The components of the integrating network 80–83, the NAND gate 85, and the inverter 86 in combination function as the NOR gate 89 shown in FIG. 1 such that whenever a positive pulse appears on either one of the outputs 40 or 42 of the latch 4, a negative pulse is provided at the output of the inverter 86 to trigger the one-shot 87. Whenever the one-shot 87 is triggered, an output pulse of selected duration is provided to drive the audible indicator 19. The duration of the output pulse from the one-shot 87 is determined by the values of a resistor 91 and capacitor 92 which are connected across the power supply 60 and to the proper frequency determining terminals 94 of the one-shot 87. The control circuit 1 is further provided with an indicator which is activated whenever an enable condition is provided at the output 7. In the illustrated circuit 1, an inverter 96 is connected through a resistor 97 and an LED to the power supply terminal 64. Whenever a logic 1 is provided on the output 7, the inverter 96 provides a logic zero at the output thereof which functions to sink current from the power supply 60 through the LED 98 illuminating same.

In order to provide for the possibility that the acreage counter 2 does not operate at the same logic voltage levels or logic polarity, the control circuit 1 includes interface means 100. The interface means 100 includes a logic inverter 101 having the input thereof connected to the output 7 of the latch 4 and having the output thereof connected through an interface inverter 102 to an externally accessible control output terminal 103. While the inverter 101 is connected (not shown) to the power supply 60, the interface inverter 102 is provided with a positive terminal 104 and a ground terminal 105 which are exernally accessible for connection to the power supply (not shown) of the acreage counter 2 which the control circuit 1 is to control. The ground terminal 105 is connected to the ground terminal 62 of the power supply 60 so that the power supplies of the control circuit 1 and acreage counter 2 are referenced to the same ground. By means of the interface means 100, the logic conditions provided in terms of the voltage levels of the power supply 60 are converted to logic voltage levels which are compatible with the acreage counter which the control circuit 1 is to control. The interface means 100 is further provided with a second interface inverter 106 having the input thereof connected to the terminal 103. An output 107 of the inverter 106, therefore, provides the logical complement of the logic condition provided on the terminal 103 in order to render the control circuit 1 compatible with an acreage counter 2 wherein the polarity of the logic conditions therein is opposite from that of the control circuit 1. The inverter 106 receives power by connection to the external power supply terminals 104 and 105 for the same reasons as does the inverter 102.

FIG. 2 illustrates an acreage counter which the control circuit 1 is suitable to control. The acreage counter 2 includes a rotation sensor 110, a one-shot 111, a clock circuit 112, programmable divider means 113, a digital counter 114, and a digital display 115. The rotation sensor 110 is preferably a magnetic type of rotation sensor wherein a magnet (not shown) is mounted on a rotating member of the implement with which the counter 2 is used and which rotates in proportion to the distance traveled by the implement. The rotation sensor 110 provides one electrical pulse for each rotation of the rotating member of the implement. The one-shot 111 is operative to provide an output pulse therefrom for each input pulse received, provided a reset terminal 116 thereof has the proper logic condition thereon. The clock circuit 112 is operative to provide a selected number of output pulses therefrom for each input pulse received from the one-shot 111. The clock circuit 112 includes a flip-flop 117, a clock pulse generator or clock 118, and a dual decade counter or divide by one hundred circuit 119. The flip-flop 117 includes an input 120, an output 121, and a reset terminal 122. The clock 118 includes a reset input 123 and an output 124. Upon receiving a pulse at the input 120 thereof, the flip-flop 117 provides an enable voltage level at the output 121 thereof which is received by the clock 118 on the reset terminal 123 thereof and which causes the clock 118 to begin generating clock pulses at the output 124 thereof. The clock pulses are received by the counter 119 and when one hundred pulses have been received thereby, a pulse is provided at an output thereof to the reset terminal 122 of the flip-flop 117. Upon receiving the reset signal, the flip-flop 117 removes the enable level from the output 121 thereof whereby the clock 118 ceases to provide the clock pulses.

The programmable divider means 113 includes a programmable counter or divide by (N+1) circuit 127 and a two decade program switch 128. The program switch 128 includes a pair of thumbwheels (not shown) which are operated to set the value of "N". The value of "N" is a calibration factor which takes into consideration the area units desired for measuring acreage, the width of the implement with which the acreage counter 2 is employed, and the linear distance traveled during each rotation of the rotating member associated with the rotation sensor 110. The programmable divider means 113 receives the pulses from the clock 118 and provides a number of output pulses therefrom depending upon the setting of the program switch 128. A decade counter or divide by ten circuit 129 may be provided between the programmable divider means 113 and the digital counter 114 for scaling purposes. The digital counter 114 accumulates the pulses as divided by the divider means 113 and decade counter 129 and displays the count on the four digit liquid crystal display 115. The control circuit 1 is connected to the acreage counter 2 through the reset input 116 of the one-shot 111. Whenever the output 103 of the control circuit 1 has the enable logic condition thereon, the one-shot 111 provides pulses to the input 120 of the flip-flop 117 thereby causing the clock 118 to generate pulses at the output 124 thereof. When the output 103 of the control circuit 1 has the inhibit logic condition thereon, the one-shot 111 is inhibited from providing the pulses to the input 120 of the flip-flop 117, whereby the clock 118 is prevented from provided pulses at the output 124 and whereby acreage covered by the implement with which the acreage counter 2 is employed is not measured.

Referring to FIG. 4, the control circuit 1 is enclosed in a suitable housing 130 having the components of the control circuit mounted therein and having the power switch 63, the enable indicator LED 98, the audible indicator 19, and a pair of delay time adjusting knobs 131 and 132 provided on a front panel 133 thereof. The knobs 131 and 132 are mechanically connected respectively to the adjustable resistors 57 and 58 and are operable to adjust the delay time provided by the delay means 5. The housing 130 also provides for connection of an actuating means cable 134 and an acreage counter control cable 135 thereto. As shown in FIG. 5, the actuating means cable 134 provides for connection of the actuating means 6 to the control circuit 1. Similarly, the cable 135 provides for connection of the control circuit 1 to the acreage counter 2.

FIG. 5 illustrates an exemplary embodiment of a bracket 138 for mounting the lever position sensing LED's 28–30 and phototransistors 32–34 in association with the operating lever 21. The bracket 138 includes a first leg 139 having the lever position sensing LED's 28, 29, and 30 mounted thereon. A second leg 140 of the bracket has the phototransistors 32, 33, and 34 mounted thereon in alignment respectively with the associated LED's 28–30. The legs 139 and 140 are connected in spaced apart parallel relationship by end portions 141 having mounting tabs 142 projecting therefrom. The bracket 138 may be mounted on the operating console 143 of the tractor (not shown) employed to draw the implement associated with the acreage counter 2 by means such as fasteners 144. The bracket 138 may be constructed in any suitable size or shape to conform to the requirements of the operating console 143.

FIG. 6 illustrates a modified actuating means 150 for use with implements such as some types of combines wherein the working elements are controlled by the actions of an operating switch 151. The operating switch 151 is connected to an implement battery 152 and is operable to connect the battery 152 to either a raise solenoid 153, a lower solenoid 154, or a neutral position 155. The raise and lower solenoids 153 and 154 are connected to the implement ground 156 and are operative when energized to actuate respective hydraulic valves (not shown) to effect the raising or lowering of the working portions of the implement. In the modified actuating means 150, the LED/phototransistor pairs are replaced by an enable relay 157 and an inhibit relay 158. In general, it is not necessary to provide for a float type function in such an implement; therefore, no float relay is provided. In the enable relay 157, the relay coil 159 thereof is connected in parallel with the lower solenoid 154. The enable relay 157 includes a normally closed switch contact set 160 which is connected between the control circuit ground 62 and the current limiting resistor 67 which is associated with the enable input 15 of the control circuit 1. Similarly, the relay coil 161 of the inhibit relay 158 is connected in parallel with the raise solenoid 153, and the normally closed switch contact set 162 thereof is connected between the control circuit ground 62 and the current limiting resistor 67 which is associated with the inhibit input 17 of the control circuit 1. In the modified actuating means 150, the float input 16 of the control circuit 1 is connected directly to the control circuit ground 62. When the switch contacts 160 and 162 are closed, logic zeros, that is ground potential, is provided respectively to the inverters 73, 74, and 77. When the implement battery 152 is connected, for example, to the lower solenoid 154, the enable relay coil 159 is energized, thereby opening the enable relay contacts 160 and providing a logic one, substantially the voltage of the control circuit power supply 60, to the enable input 15. Upon this occurrence, an enable logic condition is provided at the control output 103 of the control circuit 1. In a similar manner, when the implement battery 152 is connected to the raise solenoid 153, the inhibit relay coil 161 is energized thereby opening the inhibit relay contacts 162 and providing a logic one to the inhibit input 17 and causing an inhibit logic condition to be provided on the control terminal 103. The float input 16, being connected directly to the control circuit ground 62, is always provided with a logic zero and, therefore, has no effect on the operation of the control circuit 1.

FIG. 7 illustrates a modification to the control circuit 1 which is a switching interface circuit 164 for use with an acreage counter 165 which requires the operation of a switch 166 to effect enabling and inhibiting thereof. In the acreage counter 165, the switch 166 is opened to enable same and closed to inhibit same. For compatibility of the control circuit 1 with this type of acreage counter, a control relay 167 is provided. The relay 167 includes a set of normally open relay contacts 168 which are connected in parallel with the control switch 166. The relay coil 169 is driven by a relay driver means or gate 170 which is connected to one of the control outputs 103 or 107 of the control circuit 1. Any type of logic gate which can supply or sink the required amount of current for the relay coil 169 may be employed. If the gate employed is a non-inverting type such as an AND-/OR, or a buffer/driver, the input of the gate 170 is connected to the control output 103 of the control circuit 1; and the relay coil 169 is connected from the output of the gate to the control circuit ground 62. However, if the gate 170 is an inverting type of gate, such as a NAND, NOR, or inverter, the input of the gate 170 is connected to the complementary control output 107 of the control circuit 1. The illustrated gate 170 is a dual input NAND gate such as one-half of a CD 40107 BE manufactured by RCA. The inputs 171 of the gate 170 are connected together and to the output 107 of the control circuit 1. The relay coil 169 is connected between the positive output terminal 64 of the control circuit power supply 60 and the output 172 of the gate 170. The gate 170 is also connected across the control circuit power supply 60. Since the illustrated NAND gate 170 is a COS/MOS type of device, the shunt diode 173 is provided to prevent excessive current flow through the electrostatic protection diodes within the gate 170. The logic conditions provided on the complementary control output 107 are the complement or opposite of the logic conditions provided on the control output 103. An enable logic zero provided on the output 107 is converted to a logic one at the output 172 of the gate 170; therefore, the relay coil 169 is not energized and the contacts 168 remain open. However, an inhibit logic one provided on the output 107 is inverted to a logic zero, substantially ground potential, at the output 172 whereby the relay coil 169 is energized, thereby closing the contacts 168 and providing an inhibit logic condition to the acreage counter 165. It would be possible to provide the required switching conditions to an acreage counter requiring a closed switch for an enable logic condition by suitable modifications to the switching interface circuit 164 with regard to the switching requirements, the logic voltage levels, and logic polarities of such an acreage counter.

It is to be understood that while certain forms of the present invention have been described and illustrated, it is not to be limited thereto except insofar as such limitations are included in the following claims.

What is claimed and desired to secure by Letter Patent is:

1. A control circuit for use with an acreage counter employed with an agricultural implement to monitor acreage worked, said control circuit causing the acreage counter to begin counting by supplying an enable logic condition thereto when the implement is placed in a working position and causing the acreage counter to cease counting by supplying an inhibit logic condition thereto when the implement is placed in a nonworking position, the implement including manual operating means to effect movement thereof between the working and nonworking positions, said control circuit comprising:
   (a) bistable switch means operatively connected to an acreage counter and providing at an output of said switch means an enable logic condition when in a first state to activate said acreage counter and providing an inhibit logic condition when in a second state to deactivate said acreage counter;
   (b) delay means connected to said switch means and providing a state changing signal thereto after a selected delay time beginning upon actuation of said delay means, said delay means allowing the adjustment of the position of the associated implement without changing the state of said switch means;
   (c) actuation means connected to said delay means and cooperating with manual operating means of an agricultural implement to actuate said delay means
   (d) said actuation means causes said delay means to initiate the running of said delay time in response to the placement of said manual operating means in a cultivate position; and
   (e) said delay means cancels the running of said delay time and does not provide said state changing signal to said switch means in response to the placement of the operating means in a position other than the cultivate position before the end of said delay time.

2. A control circuit as set forth in claim 1 wherein said operating means is a manual operating switch means having a first switch condition effecting movement of the agricultural implement to a working position thereof and a second switch condition effecting movement of the implement to a nonworking position thereof, and wherein said actuation means includes:
  (a) an enable relay having an enable coil connected to the operating switch means and energized by said first switch condition of the operation switch means;
  (b) an inhibit relay having an inhibit coil connected to said operating switch means and energized by said second switch condition of the operation switch means;
  (c) said enable relay having enable switch contacts operatively to said delay means to actuate same upon said enable coil being energized; and
  (d) said inhibit relay having inhibit switch contacts operatively connected to said delay means to actuate same upon said inhibit coil being energized.

3. A control circuit as set forth in claim 1 including: indicator means connected to said output of said switch means and operative to provide an indication of a change in said logic condition on said output of said switch means.

4. A control circuit as set forth in claim 1 including: a logic inverter circuit operatively connected to said output of said switch means thereby rendering said control circuit compatible with an acreage counter requiring logic conditions which are the logical complement of said logic conditions provided by said control circuit.

5. A control circuit for an acreage counter capable of being controlled to start counting acreage by an enable logic condition and to cease counting by an inhibit logic condition, said control circuit providing said enable and inhibit logic conditions and comprising:
  (a) bistable switch means having a first input, a second input, and an output and providing said enable logic condition when in a first state and providing said inhibit logic condition when in a second state;
  (b) enable delay means connected to said first input of said switch means and effecting said first state thereof upon actuation of said enable delay means after a first selected delay;
  (c) enable actuation means connected to said enable delay means and operable to actuate same, whereby said acreage counter is caused to begin counting acreage after said first selected delay;
  (d) inhibit delay means connected to said second input of said switch means and effecting said second state thereof upon actuation of said inhibit delay means after a second selected delay;
  (e) inhibit actuation means connected to said inhibit delay means and operable to actuate same, whereby said acreage counter is caused to cease counting acreage after said second selected delay;
  (f) said acreage counter being employed with an agricultural implement to monitor the acreage worked thereby, the implement including an operating lever to effect movement of the implement between a working position and a nonworking position;
  (g) said enable actuation means including:
    (1) enable light source means; and
    (2) enable photocell means operatively connected to said enable delay means and positioned to receive a first beam of light from said enable light source means and responsive to interruption of said first beam of light to actuate said enable delay means;
  (h) said inhibit actuation means including:
    (1) inhibit light source means; and
    (2) inhibit photocell means operatively connected to said inhibit delay means and positioned to receive a second beam of light from said inhibit light source means and responsive to interruption of said second beam of light to actuate said inhibit delay means; and
  (i) said enable actuation means and said inhibit actuation means being positioned for interruption of said first beam of light upon placement of the operating lever to move the implement to the working position thereof and for interruption of said second beam upon placement of the operating lever to move the implement to the nonworking position thereof.

6. A control circuit as set forth in claim 5 including a lever position sensing bracket, said bracket including:
  (a) a light source leg having said enable light source means and said inhibit light source means positioned thereon;
  (b) a photocell leg attached in spaced apart relation to said light source leg and having said enable photocell means and said inhibit photocell means positioned thereon in opposition respectively to said enable light source means and said inhibit light source means; and
  (c) said bracket being mounted with said light source leg and said photocell leg on opposite sides of the operating lever.

7. A control circuit for use with an acreage counter employed with an agricultural implement to monitor acreage worked, said control circuit causing the acreage counter to begin counting by supplying an enable logic condition thereto when the implement is placed in a working position and causing the acreage counter to cease counting by supplying an inhibit logic condition thereto when the implement is placed in a nonworking position, the implement including operating means to effect movement thereof between the working and nonworking positions, said control circuit comprising:
  (a) bistable switch means providing at an output thereof said enable logic condition when in a first state and said inhibit logic condition when in a second state;
  (b) delay means connected to said switch means and providing a state changing signal thereto after a selected delay time beginning upon actuation of said delay means;
  (c) actuation means connected to said delay means and cooperating with operating means of an agricultural implement to actuate said delay means; and
  (d) said operating means being an operating lever for placement in a first position to effect movement of the implement to the working position and for placement in a second position to effect movement of the implement to the nonworking position, and said actuation means including:
    (1) enable light source means and inhibit light source means;
    (2) enable photocell means operatively connected to said delay means, positioned to receive a first beam of light from said enable light source means, and responsive to interruption of said first beam of light to actuate said delay means;
    (3) inhibit photocell means operatively connected to said delay means, positioned to receive a second beam of light from said inhibit light source means, and responsive to interruption of said second beam of light to actuate said delay means; and (4) said light source means and photocell means being positioned for interruption of said first beam of light upon placement of the operating lever in the first position and for interruption of said second beam of light upon placement of the operating lever in the second position.

8. In combination:

(a) an acreage counter for use with an agricultural implement to monitor acreage worked, said implement having operating means associated therewith to effect movement of said implement between a working position and a nonworking position, and said acreage counter being controlled to begin counting by an enable logic condition supplied thereto and to cease counting by an inhibit logic condition supplied thereto;

(b) a control circuit connected to said acreage counter for supplying said enable and inhibit logic conditions, said control circuit comprising:

(1) bistable switch means providing at an output thereof said enable logic condition when in a first state and said inhibit logic condition when in a second state;

(2) delay means connected to said switch means and providing a state changing signal thereto after a selected delay time beginning upon actuation of said delay means; and (3) actuation means connected to said delay means and cooperating with operating means of an agricultural implement to actuate said delay means; and (d) said operating means being an operating lever for placement in a first position to effect movement of the implement to the working position and for placement in a second position to effect movement of the implement to the nonworking position, and said actuation means including:

(1) enable light source means and inhibit light source means;

(2) enable photocell means operatively connected to said delay means, positioned to receive a first beam of light from said enable light source means, and responsive to interruption of said first beam of light to actuate said delay means;

(3) inhibit photocell means operatively connected to said delay means, positioned to receive a second beam of light from said inhibit light source means, and responsive to interruption of said second beam of light of actuate said delay means; and (4) said light source means and photocell means being positioned for interruption of said first beam of light upon placement of the operating lever in the first position and for interruption of said second beam of light upon placement of the operating lever in the second position.

9. A control circuit as set forth in claims 7 or 8 including:

(a) a lever position sensing bracket having opposite spaced apart legs, said bracket for mounting with said legs positioned on opposite sides of the operating lever; and (b) said light source means and said photocell means being positioned in opposing relation on said legs of said bracket such that said first beam of light is interrupted upon placement of the operating in the first position thereof and said second beam of light is interrupted upon placement of the operating lever in the second position thereof.

10. A control circuit as set forth in claims 7 or 8 wherein:

(a) each of said light source means is an infrared light emitting device; and (b) each of said photocell means is a phototransistor responsive to infrared light.

11. A control circuit for use with an acreage counter employed with an agricultural implement to monitor acreage worked, said control circuit causing the acreage counter to begin counting by supplying an enable logic condition thereto when the implement is placed in a working position and causing the acreage counter to cease counting by supplying an inhibit logic condition thereto when the implement is placed in a nonworking position, the implement including operating means to effect movement thereof between the working and nonworking positions, said control circuit comprising:

(a) bistable switch means providing at an output thereof said enable logic condition when in a first state and said inhibit logic condition when in a second state;

(b) delay means connected to said switch means and providing a state changing signal thereto after a selected delay time beginning upon the actuation of said delay means;

(c) actuation means connected to said delay means and cooperating with operating means of an agricultural implement to actuate said delay means; and (d) said control circuit including a first power supply providing a first supply voltage and including interface means operatively connected to said output of said switch means, said interface means rendering said control circuit compatible with an acreage counter having a supply voltage different from said first supply voltage.

12. In combination:

(a) an acreage counter for use with an agricultural implement to monitor acreage worked, said implement having operating means associated therewith to effect movement of said implement between a working position and a nonworking position, and said acreage counter being controlled to begin counting by an enable logic condition supplied thereto and to cease counting by an inhibit logic condition supplied thereto;

(b) a control circuit connected to said acreage counter for supplying said enable and inhibit logic conditions, said control circuit comprising:

(1) bistable switch means providing at an output thereof said enable logic condition when in a first state and said inhibit logic condition when in a second state;

(2) delay means connected to said switch means and providing a state changing signal thereto after a selected delay time beginning upon the actuation of said delay means; and (3) actuation means connected to said delay means and cooperating with operating means of an agricultural implement to actuate said delay means; and (d) said control circuit including a first power supply providing a first supply voltage and including interface means operatively connected to said output of said switch means, said interface means rendering said control circuit compatible with an acreage counter having a supply voltage different from said first supply voltage.

13. A control circuit as set forth in claims 11 or 12 wherein said interface means includes:
   (a) an interface gate circuit having a control input, an output, and a first and second power supply terminals;
   (b) said acreage counter having a second power supply providing a second supply voltage, said second power supply being connected in proper polarity to said first and second power supply terminals of said interface gate circuit;
   (c) said control input of said interface gate circuit being operatively connected to said output of said switch means; and
   (d) said output of said interface gate circuit being connected to said acreage counter and providing said logic conditions thereto.

14. In combination:
   (a) an acreage counter for use with an agricultural implement to monitor acreage worked, said implement having operating means associated therewith to effect movement of said implement between a working position and a nonworking position, and said acreage counter being controlled to begin counting by an enable logic condition supplied thereto and to cease counting by an inhibit logic condition supplied thereto;
   (b) a control circuit connected to said acreage counter for supplying said enable and inhibit logic conditions, said control circuit comprising:
      (1) bistable switch means providing at an output thereof said enable logic condition when in a first state and said inhibit logic condition when in a second state;
      (2) delay means connected to said switch means and providing a state changing signal thereto after a selected delay time beginning upon the actuation of said delay means; and
      (3) actuation means connected to said delay means and cooperating with operating means of an agricultural implement to actuate said delay means; and
   (c) said acreage counter including a switch having a set of switch contacts, said switch being capable of an open switch state and a closed switch state, said acreage counter being enabled in response to one of said switch states and being inhibited in response to the other of said switch states, and said control circuit further including:
      (1) a relay including a relay coil and a set of relay switch contacts which are opened and closed in response to a respective state of energization of said relay coil;
      (2) said relay contacts being connected in parallel with said switch contacts of said acreage counter;
      (3) relay driver means having an input operatively connected to said output of said bistable switch means and having an output;
      (4) said relay coil being connected across said output of said relay driver means and a proper polarity terminal of a power supply of said control circuit for energization in response to one of said logic conditions of said bistable switch means and for deenergization in response to the other of said logic conditions; and
      (5) said relay driver means, relay coil, and relay switch contacts being so configured and so connected that said acreage counter is enabled in response to said enable logic condition of said bistable switch means and is inhibited in response to said inhibit logic condition.

* * * * *